United States Patent
Ram et al.

(10) Patent No.: US 12,423,160 B2
(45) Date of Patent: Sep. 23, 2025

(54) SYSTEM AND METHOD OF DYNAMICALLY ADJUSTING VIRTUAL MACHINES FOR A WORKLOAD

(71) Applicant: Microsoft Technology Licensing, LLC, Redmond, WA (US)

(72) Inventors: Soumya Ram, Cambridge, MA (US); Preston Tapley Stephenson, Boston, MA (US); Alexander David Fischer, Salt Lake City, UT (US); Mahmoud Sayed, Hyattsville, MD (US); Robert Edward Minneker, Seattle, WA (US); Eli Cortez Custodio Vilarinho, Woodinville, WA (US); Felipe Vieira Frujeri, Kirkland, WA (US); Inigo Goiri Presa, Redmond, WA (US); Sidhanth M. Panjwani, New York, NY (US); Yandan Wang, Kirkland, WA (US); Camille Jean Couturier, Nantes (FR); Jue Zhang, Beijing (CN); Fangkai Yang, Beijing (CN); Si Qin, Beijing (CN); Qingwei Lin, Beijing (CN); Chetan Bansal, Seattle, WA (US); Bowen Pang, Beijing (CN); Vivek Gupta, Groton, MA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 436 days.

(21) Appl. No.: 17/806,191

(22) Filed: Jun. 9, 2022

(65) Prior Publication Data

US 2023/0401103 A1 Dec. 14, 2023

(51) Int. Cl.
*G06F 9/44* (2018.01)
*G06F 9/50* (2006.01)

(52) U.S. Cl.
CPC .......... *G06F 9/5077* (2013.01); *G06F 9/5022* (2013.01); *G06F 9/5033* (2013.01);
(Continued)

(58) Field of Classification Search
CPC ..................................................... G06F 9/5007
(Continued)

(56) References Cited

U.S. PATENT DOCUMENTS 9,218,207 B1 12/2015 Neuse et al.
2008/0295096 A1* 11/2008 Beaty ................. G06Q 30/0202
718/1

(Continued)

OTHER PUBLICATIONS

"International Search Report and Written Opinion Issued in PCT Application No. PCT/US23/022442", Mailed Date: Aug. 4, 2023, 13 Pages.

(Continued)

*Primary Examiner* — Timothy A Mudrick

(57) ABSTRACT

A method for dynamically adjusting a number of virtual machines for a workload, includes: receiving a probability indicator for each of a plurality of N sequential stages, where N is a natural number greater than 1, of a likelihood that a virtual machine assigned to a workload will be evicted during the N sequential stages; predicting a target number of virtual machines to configure in a current stage for a subsequent stage from among the plurality of N sequential stages based on the probability indicator, a target capacity for the workload, and a current price for maintaining a virtual machine; and configuring a number of virtual machines for the workload during the current stage based on the target number to be loaded for the workload for the subsequent stage.

20 Claims, 4 Drawing Sheets

(52) U.S. Cl.
CPC ............ *G06F 9/505* (2013.01); *G06F 9/5083*
(2013.01); *G06F 2209/5022* (2013.01); *G06F 2209/503* (2013.01)

(58) Field of Classification Search
USPC ........................................................ 719/105
See application file for complete search history.

(56) References Cited

U.S. PATENT DOCUMENTS

| | | |
|---|---|---|
| 2018/0321971 A1 | 11/2018 | Bahramshahry et al. |
| 2022/0374276 A1* | 11/2022 | Mitra ................ G06Q 30/0201 |

OTHER PUBLICATIONS

"Prediction Intervals for Random Forests", Retrieved From: https://blog.datadive.net/prediction-intervals-for-random-forests/, Jun. 2, 2015, 13 Pages.

* cited by examiner

SYSTEM AND METHOD OF DYNAMICALLY ADJUSTING VIRTUAL MACHINES FOR A WORKLOAD

BACKGROUND

A virtual machine is a compute resource that is implemented as software on a physical host computer to emulate functionality of another separate computer. A plurality of virtual machines hosted by a cloud services provider may be monetized based on an on-demand model and a spot model. The on-demand model ensures that a virtual machine is always available to service a user's request, and the spot model allows users to utilize temporary excess capacity of virtual machines when available, typically at a lower cost than that of the on-demand model. However, to ensure that the capacity of on-demand virtual machines is not affected, spot virtual machines may be evicted at any time when no spare capacity remains.

The above information disclosed in this Background section is for enhancement of understanding of the background of the present disclosure, and therefore, it may contain information that does not constitute prior art.

SUMMARY

Embodiments of the present disclosure are directed to systems and methods for dynamically adjusting a number of virtual machines to maintain or substantially maintain a target capacity for a workload while reducing costs.

According to one or more embodiments a method for dynamically adjusting a number of virtual machines for a workload, includes: receiving a probability indicator for each of a plurality of N sequential stages, where N is a natural number greater than 1, of a likelihood that a virtual machine assigned to a workload will be evicted during the N sequential stages; predicting a target number of virtual machines to configure in a current stage for a subsequent stage from among the plurality of N sequential stages based on the probability indicator, a target capacity for the workload, and a current price for maintaining a virtual machine; and configuring a number of virtual machines for the workload during the current stage based on the target number to be loaded for the workload for the subsequent stage.

In an embodiment, the N sequential stages may correspond to different time horizons from each other.

In an embodiment, a length of each of the N sequential stages may correspond to a configuration time of a virtual machine, and the configuring of the number of virtual machines for the workload may take a length of one stage to complete.

In an embodiment, the predicting of the target number may include: constraining, based on a target capacity for the workload, the target number based on an anticipated changed capacity estimated for each of the plurality of N sequential stages; constraining, based on a budget allocated for the workload, the target number based on a cost associated with the anticipated changed capacity of each of the current stage and the subsequent stage; and calculating, based on a cost function, a final value for the target number that minimizes the cost function, while satisfying at least the constraints based on the target capacity and the budget.

In an embodiment, the final value for the target number may be determined according to an integer linear program, and the constraints based on the target capacity and the budget may be inputs constraining the target number in the cost function.

In an embodiment, the plurality of N sequential stages may include the current stage, an (N−1)-th stage after the current stage as the subsequent stage, and an N-th stage after the (N−1)-th stage as a last stage from among the plurality of N sequential stages, and the probability indicator may include: a first probability indicator of a likelihood that a virtual machine assigned to the workload will be evicted during the current stage; an (N−1)-th probability indicator of a likelihood that a virtual machine assigned to the workload will be evicted during the subsequent stage; and an N-th probability indicator of a likelihood that a virtual machine assigned to the workload will be evicted during the last stage.

In an embodiment, to estimate the anticipated changed capacity for each of the plurality of N sequential stages, the method may include: determining a current number of virtual machines assigned to the workload at a start of the current stage; estimating the anticipated changed capacity for the current stage that satisfy the target capacity, the anticipated changed capacity for the current stage corresponding to a change in the current number of virtual machines at an end of the current stage based on the first probability indicator and a value of the target number that is constrained by the target capacity; estimating an anticipated changed capacity for the subsequent stage that satisfy the target capacity based on the anticipated changed capacity for the current stage, the (N−1)-th probability indicator, and a value of a potential number of virtual machines to configure during the subsequent stage that is constrained by the target capacity; and estimating an anticipated changed capacity for the last stage that satisfy the target capacity based on the anticipated changed capacity of the current stage, the anticipated changed capacity of the subsequent stage, and the third probability indicator. The anticipated changed capacity for the last stage may further constrain the values of the target number and the potential number based on the target capacity.

In an embodiment, to determine the cost associated with the anticipated changed capacity of each of the current stage and the subsequent stage, the method may include: determining a current price for maintaining a virtual machine for the workload; calculating a current cost associated with the anticipated changed capacity of the current stage based on the current price, and constrained by the budget; and calculating a current cost associated with the anticipated changed capacity of the subsequent stage based on the current price, and constrained by the budget.

In an embodiment, the plurality of virtual machines may include a first virtual machine, and a second virtual machine having a higher cost than that of the first virtual machine, and the budget may correspond to the target capacity multiplied by the higher cost of the second virtual machine.

In an embodiment, the final value for the target number may be further constrained according to a threshold limit of a maximum number of virtual machines that may be added in one stage, and a threshold limit of a total number of virtual machines that may be assigned to the workload at any given time.

According to one or more embodiments, a system for dynamically adjusting a number of virtual machines assigned to a workload, includes: a processor; and memory including instructions that, when executed by the processor, cause the processor to: receive a probability indicator for each of a plurality of N sequential stages, where N is a natural number greater than 1, of a likelihood that a virtual machine assigned to a workload will be evicted during the N sequential stages; predict a target number of virtual machines to configure in a current stage for a subsequent stage from among the plurality of N sequential stages based on the probability indicator, a target capacity for the workload, and a current price for maintaining a virtual machine; and configure a number of virtual machines for the workload during the current stage based on the target number to be loaded for the workload for the subsequent stage.

In an embodiment, the N sequential stages may correspond to different time horizons from each other.

In an embodiment, a length of each of the N sequential stages may correspond to a configuration time of a virtual machine, and the configuring of the number of virtual machines for the workload may take a length of one stage to complete.

In an embodiment, to predict the target number, the instructions may further cause the processor to: constrain, based on a target capacity for the workload, the target number based on an anticipated changed capacity estimated for each of the plurality of N sequential stages; constrain, based on a budget allocated for the workload, the target number based on a cost associated with the anticipated changed capacity of each of the current stage and the subsequent stage; and calculate, based on a cost function, a final value for the target number that minimizes the cost function, while satisfying at least the constraints based on the target capacity and the budget.

In an embodiment, the final value for the target number may be determined according to an integer linear program, and the constraints based on the target capacity and the budget may be inputs constraining the target number in the cost function.

In an embodiment, the plurality of N sequential stages may include the current stage, an (N−1)-th stage after the current stage as the subsequent stage, and an N-th stage after the (N−1)-th stage as a last stage from among the plurality of N sequential stages, and the probability indicator may include: a first probability indicator of a likelihood that a virtual machine assigned to the workload will be evicted during the current stage; an (N−1)-th probability indicator of a likelihood that a virtual machine assigned to the workload will be evicted during the subsequent stage; and an N-th probability indicator of a likelihood that a virtual machine assigned to the workload will be evicted during the last stage.

In an embodiment, to estimate the anticipated changed capacity for each of the plurality of N sequential stages, the instructions may further cause the processor to: determine a current number of virtual machines assigned to the workload at a start of the current stage; estimate the anticipated changed capacity for the current stage that satisfy the target capacity, the anticipated changed capacity for the current stage corresponding to a change in the current number of virtual machines at an end of the current stage based on the first probability indicator and a value of the target number that is constrained by the target capacity; estimate an anticipated changed capacity for the subsequent stage that satisfy the target capacity based on the anticipated changed capacity for the current stage, the (N−1)-th probability indicator, and a value of a potential number of virtual machines to configure during the subsequent stage that is constrained by the target capacity; and estimate an anticipated changed capacity for the last stage that satisfy the target capacity based on the anticipated changed capacity of the current stage, the anticipated changed capacity of the subsequent stage, and the third probability indicator. The anticipated changed capacity for the last stage may further constrain the values of the target number and the potential number based on the target capacity.

In an embodiment, to determine the cost associated with the anticipated changed capacity of each of the current stage and the subsequent stage, the instructions may further cause the processor to: determine a current price for maintaining a virtual machine for the workload; calculate a current cost associated with the anticipated changed capacity of the current stage based on the current price, and constrained by the budget; and calculate a current cost associated with the anticipated changed capacity of the subsequent stage based on the current price, and constrained by the budget.

In an embodiment, the plurality of virtual machines may include a first virtual machine, and a second virtual machine having a higher cost than that of the first virtual machine, and the budget may correspond to the target capacity multiplied by the higher cost of the second virtual machine.

In an embodiment, the final value for the target number may be further constrained according to a threshold limit of a maximum number of virtual machines that may be added in one stage, and a threshold limit of a total number of virtual machines that may be assigned to the workload at any given time.

BRIEF DESCRIPTION OF THE DRAWINGS

The above and other aspects and features of the present disclosure will be more clearly understood from the following detailed description of the illustrative embodiments with reference to the accompanying drawings.

DETAILED DESCRIPTION

Figure 1:
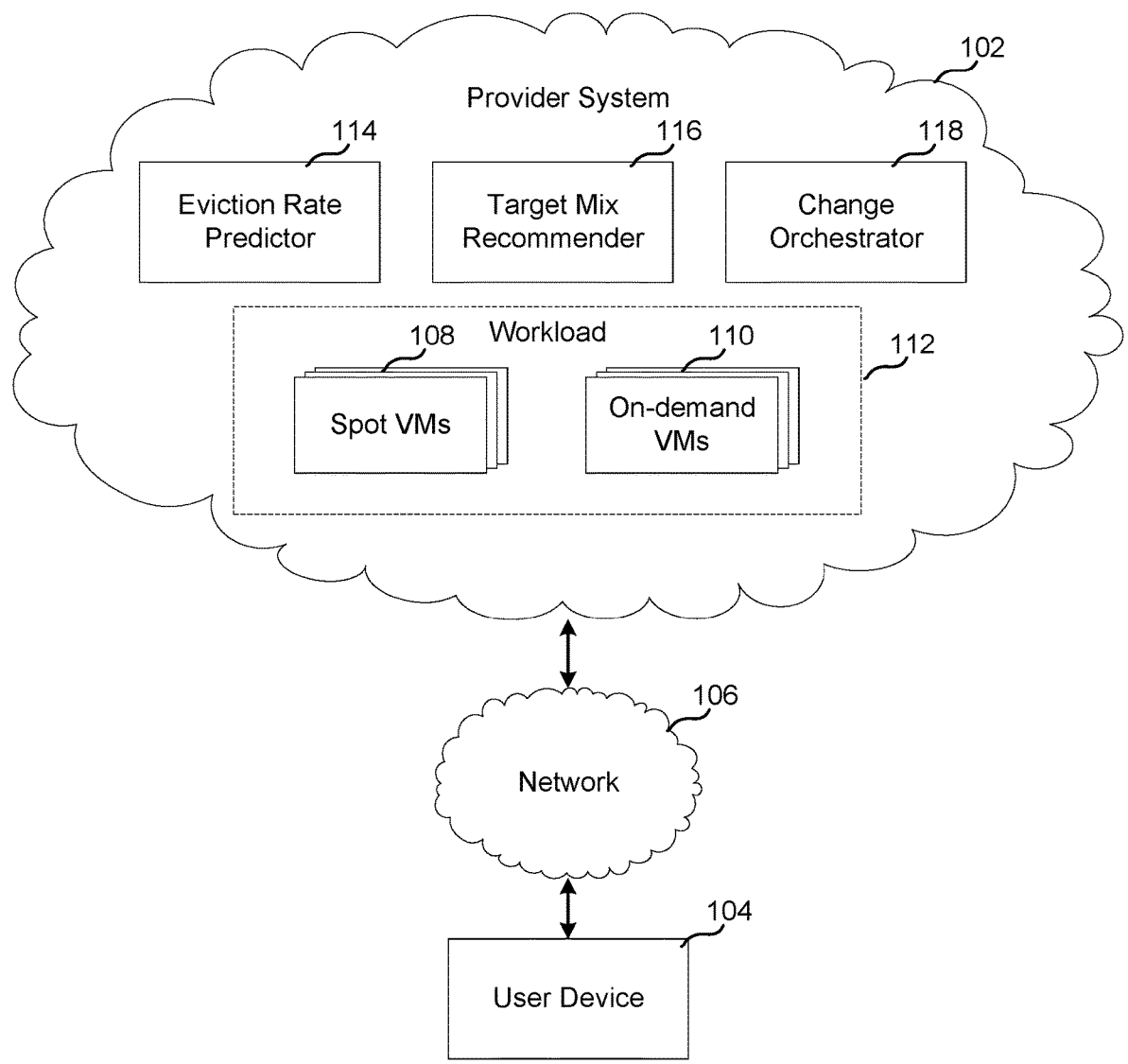
FIG. 1 is a system diagram illustrating a provider system according to one or more embodiments of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

Some provider systems may enable a user to split workloads between a mix of on-demand virtual machines (VMs)

and spot VMs to take advantage of the savings from the spot VMs while maintaining performance threshold guarantees by the on-demand VMs. Typically, such split is statically determined by the user, and thus, may be sub-optimal. Furthermore, as eviction rates may be variable over time, such static split may not adjust for these variable eviction rates, which may result in a higher number of spot VM evictions than desired.

Moreover, configuring a virtual machine (whether an on-demand VM at startup or a spot VM that is restored after eviction) for a workload may require a configuration time (or a reconfiguration time), for example, such as one to two hours, in order for the virtual machine to be fully loaded and available to service requests. Thus, even when additional capacity later becomes available, by the time the spot VM is restored for the workload, the spot VM may need to be evicted again or may be evicted soon thereafter based on changes in the available capacity. Accordingly, it may be challenging to maintain or substantially maintain a target capacity for a workload that utilizes spot VMs, while tapping into the savings associated with the utilization of such spot VMs when available.

According to one or more embodiments of the present disclosure, a number of VMs currently assigned to a workload may be dynamically adjusted ahead of time in anticipation of various eviction rates over extended time horizons, such that a target capacity of the workload may be maintained or substantially maintained in consideration of the configuration time thereof while reducing costs. For example, in some embodiments, a target number of VMs to be added for the workload for a subsequent stage (e.g., a later time horizon or time range) may be predicted in a current stage (e.g., a current time horizon or time range) according to the eviction rates and the target capacity of the workload. The current number of VMs assigned to the workload may be automatically adjusted during the current stage based on the target number of VMs, such that a suitable number of VMs may be automatically added and configured for the subsequent stage during the current stage in consideration of the configuration time thereof. Accordingly, the target number of VMs may be loaded and immediately available to service the workload at the start of the subsequent stage, even when a number of VMs are evicted.

According to one or more embodiments of the present disclosure, a split between a number of first VM types (e.g., spot VMs) and second VM types (e.g., on-demand VMs) assigned to a workload may be automatically adjusted over extended time horizons in anticipation of various eviction rates over the extended time horizons, such that a target capacity of the workload may be maintained or substantially maintained while keeping costs lower than a budget allocated for the workload. For example, in some embodiments, the budget may correspond to a cost in a case where all of the VMs of the workload are the second VM types (e.g., the on-demand VMs). Accordingly, in some embodiments, an optimal split between the number of on-demand VMs and the number of spot VMs may be automatically adjusted over time in order to maintain or substantially maintain the target capacity for the workload, while reducing costs compared to the case where all of the VMs of the workload are on-demand VMs.

The above and other aspects and features of the present disclosure will be described in more detail hereinafter with reference to the figures.

FIG. 1 is a system diagram illustrating a provider system according to one or more embodiments of the present disclosure.

Referring to FIG. 1, a provider system 102 is communicably connected to a user device 104 over a network 106. For example, the provider system 102 may be a cloud services provider system. The provider system 102 may host various virtual machines 108 and 110 to service a workload 112 for a user of the user device 104. The virtual machines are virtual compute resources implemented as software on one or more resource devices (e.g., host devices) hosted by the provider system 102. For example, the resource devices may include various compute devices (e.g., general purpose processors, central processing units, and graphics processing units), server components, database components, disk devices, storage devices (e.g., solid state drives and hard disk drives), and/or the like that are partitioned or divided to host a plurality of virtual machines hosted thereon.

As understood, the provider system 102 may include any suitable system hosting a plurality of virtual machines to process workload requests from the user. A workload corresponds to one or more tasks or processes performed by the virtual machines. For example, the user may access the provider system 102 via the user device 104 over the network 106, and may select one or more virtual machines hosted in a desired geographical area to service the workload requests. The user device 104 may include any suitable computing device, such as a desktop computer, a laptop, a tablet, a smart phone, a mobile phone, or the like, that may be communicably connected to the provider system 102 via the network 106. The network 106 may be structured to enable the exchange of data, values, instructions, messages, and/or the like among the provider system 102 and the user device 104. For example, in various embodiments, the network 106 includes any suitable wired or wireless network (e.g., a Local Area Network (LAN), a Wide Area Network (WAN), the Internet, and cellular communications network).

In some embodiments, the provider system 102 may enable the user to specify a type of virtual machine to be assigned to the workload 112 from among a first type of virtual machine 108 (e.g., spot VMs) and a second type of virtual machine 110 (e.g., on-demand VMs). For example, the first type of virtual machine 108 may service low priority workloads, such that the first type of virtual machine 108 may be evicted (e.g., removed, reallocated, or the like) at any given time based on the amount of available capacity. The second type of virtual machine 110 may service high priority workloads, such that the second type of virtual machine 110 may typically be dedicated to the workload 112 when selected. However, it should be understood that in some embodiments, the second type of virtual machine 110 may also be evicted, but may have a higher priority threshold than that of the first type of virtual machine 108, such that the second type of virtual machine 110 may be evicted only when there are no suitable first type of virtual machines 108 to evict, or if the price of the first type of virtual machines 108 exceeds a predetermined maximum price. Accordingly, the first type of virtual machine 108 may be associated with a lower utilization cost than that of the second type of virtual machine 110. For convenience, the first type of virtual machine 108 may be referred to hereinafter as a first VM 108 or a spot VM 108, and the second type of virtual machine 110 may be referred to hereinafter as a second VM 110 or an on-demand VM 110.

In some embodiments, the provider system 102 may enable the user to specify a target capacity corresponding to a number of VMs to be maintained or substantially maintained for the workload 112. Thus, rather than specifying the type of virtual machine to be assigned to the workload, the user may simply specify the target capacity for the workload 112, and the provider system 102 may automatically assign a suitable number of VMs from among the first and second VMs 108 and 110 to the workload 112 based on the target capacity specified by the user. In some embodiments, the provider system 102 may enable the user to specify the target capacity and the type of at least some of the virtual machines to be assigned to the workload 112. For example, the user may be enabled to specify the target capacity for the workload, and may further specify that at least some number of VMs from among the target capacity are to be assigned as the second VM 110 (or the first VM 108).

Still referring to FIG. 1, the provider system 102 may include an eviction rate predictor 114, a target mix recommender 116, and a change orchestrator 118. Each of the eviction rate predictor 114, the target mix recommender 116, and the change orchestrator 118 may include a processor and memory. The processors may be distinct from each other, or at least some of the processors may be implemented together (e.g., on a same processing circuit). For example, the processor may be implemented with a general-purpose processor, an Application Specific Integrated Circuit (ASIC), one or more Field Programmable Gate Arrays (FPGAs), a Digital Signal Processor (DSP), a group of processing components, or other suitable electronic processing components. The memory may include tangible, non-transient, volatile memory or non-volatile memory, such as Random Access Memory (RAM), Read-Only Memory (ROM), Non-volatile RAM (NVRAM), Flash Memory, hard disk storage, cloud storage, and/or other suitable electronic storage devices. The memory stores instructions or programming logic that, when executed by the processor, controls various operations of the eviction rate predictor 114, the target mix recommender 116, and/or the change orchestrator 118.

The eviction rate predictor 114 may determine an eviction rate for a plurality of time horizons (e.g., a plurality of time ranges) of a virtual machine (e.g., a spot VM) in the geographical area where the workload 112 is to be serviced. For example, the eviction rate predictor 114 may predict a probability (e.g., a percentage) of a likelihood that a spot VM will be evicted in a given geographical area during a given time range.

The eviction rate predictor 114 may determine the eviction rates for the given geographical area based on historical data (e.g., historical eviction rate data) for the given geographical area. The eviction rate predictor 114 may further consider various states of hardware clusters in the geographical area, such as current capacity in the given geographical area, current bandwidth in the given geographical area, current workloads being serviced in the given geographical area, and the like. For example, the eviction rates may be determined based on average number of evictions over a time range, minimum number of evictions over a time range, maximum number of evictions over a time range, and/or the like. In some embodiments, the eviction rate predictor 114 may utilize a suitable machine learning model that is trained to predict the eviction rates for the given geographical area. For example, the machine learning model may utilize a suitable regression model, such as a linear regression (LR) model, a random forest (RF) model, a gradient boosting from regression (GBDT) model, a support vector regression (SVR) model, a long short-term memory (LSTM) model, and the like.

The target mix recommender 116 receives the eviction rates from the eviction rate predictor 114, and predicts (e.g., determines) a target number of VMs to assign to the workload 112 in order to maintain or substantially maintain the target capacity throughout the time horizons associated with the eviction rates, while minimizing or reducing costs. For example, the target mix recommender 116 may determine a likelihood that a VM may be evicted in the future based on the eviction rates, and may add more VMs to the workload 112 over time considering the configuration time thereof, such that the target capacity may be maintained or substantially maintained even if a number of VMs are later evicted. However, because adding more VMs may increase costs, the target mix recommender 116 may determine the target number to maintain or substantially maintain the target capacity while minimizing or reducing costs. Here, the target number is a change (e.g., a delta) in the number of first and/or second VMs to add or remove for the workload in a current stage (e.g., a current time horizon or time range), whereas the target capacity is the desired number of VMs to maintain for the workload throughout a plurality of stages (e.g., a plurality of time horizons or time ranges). For example, as discussed in more detail below with reference to FIG. 2, in some embodiments, the target mix recommender 116 may determine the target number by minimizing a cost function, while constraining the target number based on the target capacity and a budget for the workload. In some embodiments, the target mix recommender 116 may further constrain the target number by limiting a maximum number of VMs that may be added in any given time, as well as limiting a total number of VMs that may be assigned to the workload at any given time, such as to prevent or reduce system instability.

The change orchestrator 118 may automatically add or remove a number of VMs based on the target number. For example, the change orchestrator 118 may automatically configure one or more VMs to be added or removed for the workload 112 based on the target number predicted by the target mix recommender 116. Thus, when a new VM is added to the workload, the change orchestrator 118 may transfer data to the hardware cluster hosting the new VM. Similarly, when a VM is evicted, the change orchestrator 118 may transfer data from a hardware cluster that hosted the evicted VM to a hardware cluster hosting the added VM. Accordingly, the change orchestrator 118 may transfer a job of the workload 112 from the evicted VM to the added VM, such that the added VM may continue processing the job where the evicted VM left off. Therefore, when a VM is evicted from a workload, another VM may already be fully loaded (e.g., configured or reconfigured) and ready (e.g., assigned) to continue processing the job of the evicted VM, without having to wait for the configuration or reconfiguration time for the added VM. While the change orchestrator 118 is shown in FIGS. 1 and 2 as being separate from the target mix recommender 116, in some embodiments, the change orchestrator 118 may be implemented as part of the target mix recommender 116 (e.g., on the same device or on the same processor and memory as that of the target mix recommender 116).

Figure 2:
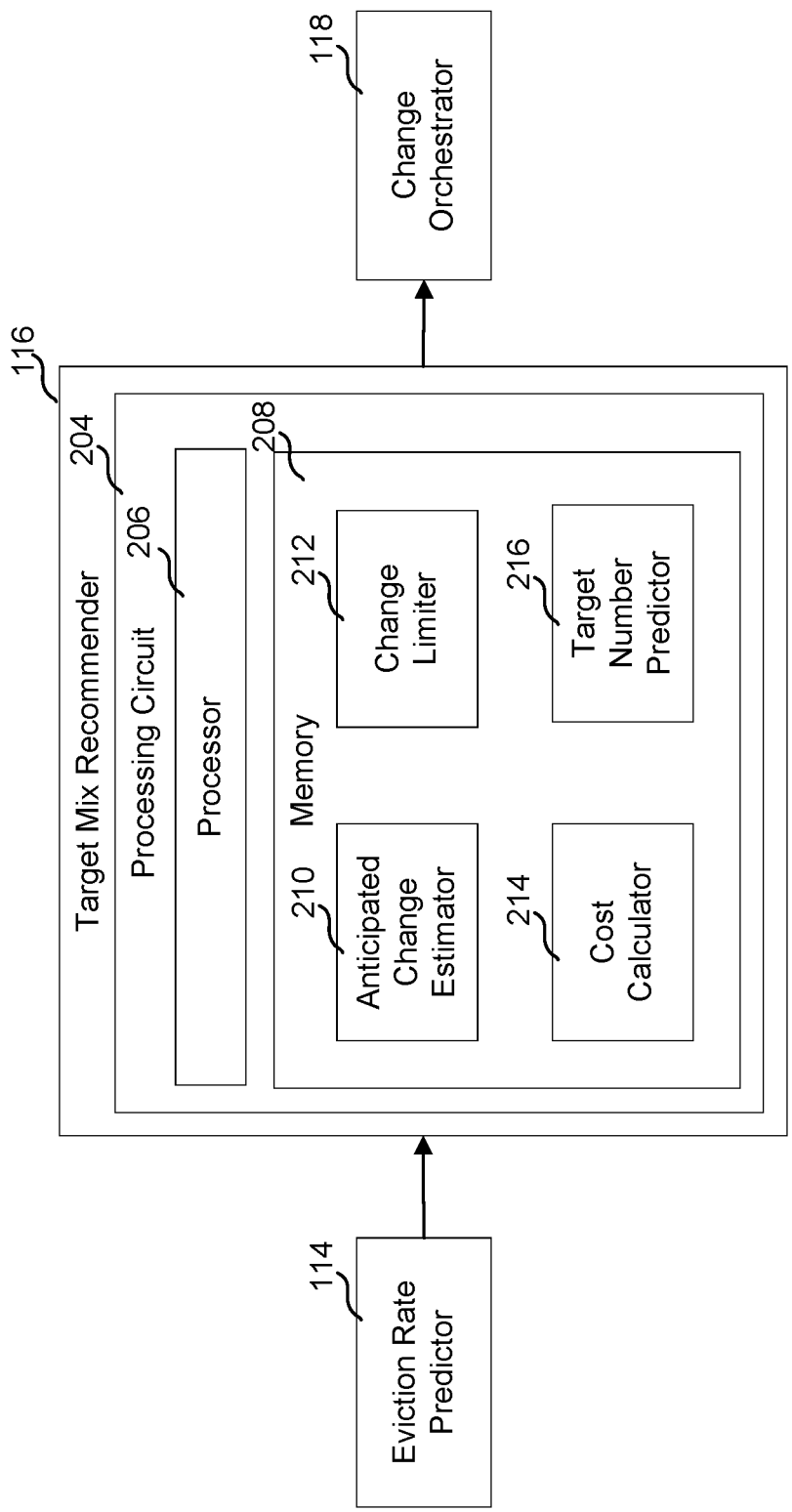
FIG. 2 is a block diagram illustrating a target mix recommender according to one or more embodiments of the present disclosure.

FIG. 2 is a block diagram illustrating a target mix recommender according to one or more embodiments of the present disclosure.

In brief overview, the target mix recommender 116 receives the eviction rates from the eviction rate predictor 114, and predicts (e.g., determines) the target number of VMs (e.g., first and/or second VMs) to add or remove for the workload based on anticipated changes in the current number of VMs assigned to the workload over time. For example, in some embodiments, the target mix recommender 116 may predict the target number using an integer linear programming method described in more detail below. The target mix recommender 116 may provide the target number to the change orchestrator 118, such that a suitable number of VMs may be configured in a current stage (e.g., a current time horizon or current time range) based on the target number to maintain or substantially maintain a target capacity in one or more subsequent stages (e.g., subsequent time horizons or time ranges) considering the configuration time thereof.

For example, in some embodiments the target mix recommender 116 may query the eviction rate predictor 114 to request eviction rates for each of a plurality of N sequential stages, where N is a natural number greater than 1. Each of the plurality of N sequential stages may correspond to different time horizons (e.g., different time ranges) from each other. A length of each of the N sequential stages may correspond to a configuration/reconfiguration time of a VM. For example, if the configuration time of a VM takes 2 hours to complete, a length of each of the N sequential stages may be 2 hours long. In other words, the configuration time for configuring or reconfiguring a VM may take the length of one stage to complete. Accordingly, the target mix recommender 116 may predict the target number to anticipate changes in a current number of VMs assigned to the workload over a plurality of stages based on the eviction rates thereof, and the change orchestrator 118 may act to add or remove the target number of VMs in a current stage, such that a suitable number of VMs may be loaded by the time a corresponding subsequent stage begins (e.g., when the current stage ends or lapses).

In more detail, referring to FIG. 2, the target mix recommender 116 may be communicably connected to the eviction rate predictor 114 and the change orchestrator 118. For example, the target mix recommender 116 may include one or more communication interfaces for communicating with the eviction rate predictor 114 and the change orchestrator 118. The eviction rate predictor 114 and the change orchestrator 118 may communicate with the target mix recommender 116 via the same communication interface or different communication interfaces. The eviction rate predictor 114 and the change orchestrator 118 may be the same or substantially the same as those described above with reference to FIG. 1, and thus, redundant description thereof may not be repeated.

The communication interface may be or include wired or wireless communication interfaces (e.g., jacks, antennas, transmitters, receivers, transceivers, wire terminals, and/or the like) for conducting data communications with the eviction rate predictor 114 and the change orchestrator 118. Communications via the communication interface may be direct (e.g., local wired or wireless communications) or via the network 106. The communication interface may support various protocols (e.g., TCP/IP, User Datagram Protocol UDP, Hypertext Transfer Protocol HTTP, Internet Message Access Protocol IMAP, Simple Mail Transfer Protocol SMTP, and the like) and/or data communication interfaces (e.g., Application Program Interface API, Web Services, and the like) for facilitating data communications with the eviction rate predictor 114 and/or the change orchestrator 118.

The target mix recommender 116 includes one or more processing circuits 204 including one or more processors 206 and memory 208. The processing circuit 204 may be communicably connected to the communication interface, such that the processing circuit 204 and the various components thereof can send and receive data via the communication interface. The processor 206 may be implemented with a general-purpose processor, an ASIC, one or more FPGAs, a DSP, a group of processing components, or other suitable electronic processing components. The processing circuit 204 and the processor 206 may be housed in a single geographic location or device, or may be distributed over various geographic locations or devices.

The memory 208 (e.g., one or more memory devices, storage devices, and/or memory units) may include tangible, non-transient, volatile memory or non-volatile memory, such RAM, ROM, NVRAM, Flash Memory, hard disk storage, cloud storage, and/or other suitable electronic storage devices. The memory 208 may be communicably connected to the processor 206 via the processing circuit 204, and includes data and/or computer code for facilitating (e.g., by processing circuit 204 and/or the processor 206) at least some of the various processes described herein. For example, the memory 208 may include database components, object code components, script components, and/or any other type of information or data structure for supporting the various activities and information or data structures described in the present application. The memory 208 stores instructions or programming logic that, when executed by the processor 206, controls the operations of the target mix recommender 116. While FIG. 2 illustrates that the eviction rate predictor 114 and the change orchestrator 118 are separate from the target mix recommender 116, in some embodiments, one or both of the eviction rate predictor 114 and the change orchestrator 118 may be implemented as part of the target mix recommender 116 (e.g., on the same device or on the same processor 206 and memory 208).

In some embodiments, the memory 208 may include an anticipated change estimator 210, a change limiter 212, a cost calculator 214, and a target number predictor 216. Each of the anticipated change estimator 210, the change limiter 212, the cost calculator 214, and the target number predictor 216 may be included in the same memory 208 to be executed by the same processor 206 or processing circuit 204, or may be distributed in different memories 208 over various geographic locations or devices to be executed by multiple different processors or processing circuits.

As described in more detail below, the anticipated change estimator 210 may constrain the target number of VMs to be added or removed in a current stage based on a target capacity. The change limiter 212 may constrain the target number by limiting the number of VMs that may be added to or removed from any given stage, and may further limit a total number of VMs that may be assigned to the workload at any given time. The cost calculator 214 may constrain the target number by limiting a cost of the number of VMs that may be assigned to the workload in the current stage based on a budget allocated for the workload. The target number predictor 216 determines a final target number of VMs to add or remove in the current stage, for example, using an integer linear programming method. For example, the target number predictor 216 may determine a final value of the target number of VMs to add or remove in the current stage that minimizes or reduces a cost function (e.g., (a number of spot VMs×current price of spot VMs)+(a number of on-demand VMs×current price of on-demand VMs)), while satisfying the constraints imposed by the change estimator 210, the change limiter 212, and the cost calculator 214. However, it should be appreciated that the target number of VMs may be dynamically determined based on at least the eviction rates, the target capacity, and the budget allocated for the workload using any suitable programming method as would be understood by those having ordinary skill in the art.

Hereinafter, for convenience, embodiments of the present disclosure will be described in more detail assuming that the target number predictor 216 predicts (e.g., determines) the target number of VMs to add or remove in a current stage corresponding to a target split between a number of the spot VMs (e.g., the first VMs 108) and a number of the on-demand VMs 110 (e.g., the second VMs 110). However, it should be appreciated that in other embodiments, the description hereinafter may be equally or substantially equally applied to embodiments where the target number predictor 216 predicts the target number corresponding to only the spot VMs (e.g., the first VMs 108), such that variables corresponding to the on-demand VMs (e.g., the second VMs 110) described below may be statically set (e.g., may be set to zero or to another suitable number), may be determined by the user when providing the target capacity for the workload, or may be omitted as needed or desired.

In some embodiments, the plurality of N sequential stages may include a first stage (e.g., a current stage), a second stage (e.g., an (N−1)-th stage), and a last stage (e.g., an N-th stage), but it should be appreciated that the plurality of N sequential stages may include any suitable number of two or more stages. Each of the stages corresponds to a different time horizon (e.g., a different time range), the length thereof corresponding to a configuration time (or a reconfiguration time) of a VM. For example, if a configuration time of a VM takes 2 hours, each of the N sequential stages may have a length of two hours. In this case, the first stage may correspond to a time horizon of 0-2 hours, the second stage may correspond to a time horizon of 2-4 hours, and the last stage may correspond to a time horizon of 4-6 hours. Accordingly, in this case, the provider system 102 takes the optimal action over a timeframe of 6 hours, but this timeframe may be extended or reduced as needed or desired. For example, in some embodiments, by increasing the number of stages (thereby increasing the timeframe), an error rate may be reduced.

The anticipated change estimator 210 may receive a probability indicator (e.g., evictions rates or survivability rates) for each of the N sequential stages from the eviction rate predictor 114. For example, when the N sequential stages includes the three stages described above, the probability indicator may include a first probability indicator of a likelihood that a virtual machine assigned to the workload will be evicted during the current stage (e.g., the first stage), a second probability indicator of a likelihood that a virtual machine assigned to the workload will be evicted in the next stage (e.g., the second stage), and a third probability indicator of a likelihood that a virtual machine assigned to the workload will be evicted in the last stage.

The probability indicator may indicate a likelihood that a virtual machine will be evicted during a stage of the N sequential stages. For example, the probability indicator may correspond to the evictions rates or survivability rates (e.g., 1—the eviction rate) of the N sequential stages. For example, the anticipated change estimator 210 may receive the eviction rates for each of the N sequential stages as the probability rates, and the anticipated change estimator 210 may calculate a survivability rate (e.g., 1—the eviction rate) of a VM in each of the N sequential stages based on the eviction rates thereof. In another embodiment, the eviction rate predictor 114 may provide the survivability rate for each of the N sequential stages based on the eviction rates thereof as the probability indicator. For example, when the N sequential stages include the three stages described above, the survivability rate for the N sequential stages may include a first survivability rate $sur_0$ corresponding to the current stage, a second survivability rate $sur_1$ corresponding to the next stage, and a third survivability rate sure corresponding to the last stage.

The anticipated change estimator 210 estimates, based on a current number of VMs assigned to the workload in the current stage and the probability indicator for each of the stages, an anticipated changed capacity in a number of VMs assigned to the workload for each of the N sequential stages that satisfy a target capacity for the workload. A difference (e.g., a delta) between the current number of VMs assigned to the workload in the current stage and a number of VMs in the anticipated changed capacity for the current stage may correspond to the target number of VMs to add or remove in the current stage. A difference between the anticipated changed capacity for the current stage and the anticipated changed capacity for the second stage may correspond to a potential number of VMs to add or remove in the second stage. Here, because of the configuration time of a VM, a potential number of VMs to add or remove in the last stage may be irrelevant to the current stage, as any VMs added or removed in the last stage would not be loaded until after the last stage has ended. Thus, the anticipated changed capacity of the last stage may be estimated to ensure that changes to the number of VMs that are added in the first two stages are sufficient to maintain or substantially maintain the target capacity for the last stage. The anticipated change estimator 210 may constrain the target number of VMs to add or remove in the first stage and the potential number of VMs to add or remove in the second stage by ensuring that the anticipated changed capacity for each of the N sequential stages satisfies the target capacity.

In more detail, the anticipated change estimator 210 may determine the current number of VMs assigned to the workload (e.g., at a start or at timepoint 0 of the current stage), and may estimate an anticipated change in the current number for each of the N sequential stages based on the probability indicator for each of the N sequential stages that satisfies the target capacity. For example, due to the 2 hour loading/configuration time of the VMs, the number of VMs assigned to the workload may be different at the start of a stage (e.g., at timepoint 0 of the current stage) from that at the end of the stage (e.g., at timepoint 2 of the current stage), which may also correspond to the start of the next stage, depending on the addition/deletion of VMs in one or more previous stages. Accordingly, in some embodiments, the anticipated change estimator 210 may determine an anticipated changed capacity of the current stage corresponding to a change in the current number of virtual machines between timepoint 0 (e.g., a current time) and timepoint 2 (e.g., a first time step after the current time) using the pseudocode shown in Equation 1 below.

Equation 1:

```
def get_capacity(s_0, d_s0, o_0, d_o0, survivability_rate):
    if d_s0 < 0:
        s_0 = s_0 + d_s0
    if d_o0 < 0:
        o_0 = o_0 + d_o0
    Return s_0 * survivability_rate + o_0
```

In Equation 1, $s_0$ corresponds to a number (e.g., a current number) of spot VMs at timepoint 0, $ds_0$ corresponds to a number of spot VMs to be added/removed at timepoint 0 and is the target number of spot VMs of the current stage having a final value determined by the target number predictor 216, $O_0$ corresponds to a number of on-demand VMs at timepoint 0, $d_{OO}$ corresponds to the number of on-demand VMs to be added/removed at timepoint 0 and is the target number of on-demand VMs of the current stage having a value determined by the target number predictor 216, and survivability_rate corresponds to the first survivability rate $sur_0$.

Thus, the pseudocode shown in Equation 1 may return the anticipated changed capacity of the current stage corresponding to the number of fully loaded (e.g., fully reconfigured and allocated) VMs that will be running after 2 hours, or in other words, after the changes in the target number of spot VMs $ds_0$ have been applied. This is because when adding VMs, the number of fully loaded VMs may not change for the current stage, as the VMs may require one stage to load (e.g., to be configured or reconfigured), but removing VMs may change the number. Thus, in some embodiments, the number of VMs that are removed (e.g., deleted) at any given time may be limited.

The anticipated change estimator 210 may estimate the anticipated changed capacity for each of the subsequent stages of the N sequential stages based on the anticipated changed capacity of the current stage and the probability indicator for each of the N sequential stages, and may constrain the anticipated changed capacity for each of the N sequential stages based on the target capacity. For example, in some embodiments, the anticipated change estimator 210 may constrain the anticipated changed capacity for each of the N sequential stages using the pseudocode shown in Equation 2 below.

if VMs are added at the start of the second stage (e.g., at timepoint 2), they will only be loaded by the end of the second stage, and thus, will be under capacity.

Thus, in the example of Equation 2 above, the anticipated change estimator 210 may constrain the values of the target number of spot VMs $ds_0$ in the current stage corresponding to the number of spot VMs to be added/removed at timepoint 0, the target number of on-demand VMs $do_0$ in the current stage corresponding to the number of on-demand VMs to be added/removed at timepoint 0, the potential number of spot VMs $ds_1$ in the second stage corresponding to a number of spot VMs to be added/removed at timepoint 2, and the potential number of on-demand VMs $d_{O1}$ in the second stage corresponding to the number of on-demand VMs to be added/removed at timepoint 2, such that the anticipated changed capacity for each of the N sequential stages is greater than or equal to the target capacity t.

It should be noted that because the loading of the VMs may take the length of one stage to complete, the number of fully loaded (e.g., fully reconfigured and allocated) VMs that will be running after 4 hours, or in other words, after the changes in $ds_1$ have been applied, may correspond to the number of VMs that are fully loaded at the start of the last stage (which becomes the current stage or the first stage at that point in time). Thus, values corresponding to the number of spot and on-demand VMs to be added/removed at timepoint 4 (which may correspond to the end of the second stage and the start of the last stage) may be irrelevant to the Equation 2:

2_1) Get_capacity($s_o$, $d_{s0}$, $o_o$, $d_{o0}$, $sur_0$) ≥ t (maintain capacity from 0-2 hours)

2_2) ($s_0 + d_{s0}$) * ($sur_0$ * $sur_1$) + $o_0$ + $d_{o0}$ ≥ t (maintain capacity from 2-4 hours)

2_3) Get_capacity(($s_0 + d_{s0}$) * $sur_0$, $d_{s1}$, ($o_0 + d_{o0}$), $d_{o1}$, $sur_1$) ≥ t (maintain capacity from 2-4 hours after changes to spot and ondemand numbers at hour 2)

2_4) Let $s_1 = (s_0 + d_{s0})$ * $sur_0$, $o_1 = (o_0 + d_{o0})$
($s_1 + d_{s1}$) * ($sur_1$ * $sur_2$) + $o_1$ + $d_{o1}$ ≥ t (maintain capacity from 4-6 hours)

In Equation 2, t corresponds to the target capacity, $s_1$ corresponds to a number of spot VMs at timepoint 2, $ds_1$ corresponds to a potential number of spot VMs to be added/removed at timepoint 2 (a final value of which is determined by the target number predictor 216), $O_1$ corresponds to a number of on-demand VMs at timepoint 2, $d_{O1}$ corresponds to a potential number of on-demand VMs to be added/removed at timepoint 2 (a final value of which is determined by the target number predictor 216), and $sur_0$, $sur_1$, and sure correspond to the first, second, and third probability indicators, respectively, for the N sequential stages as described above. Further, in Equation 2, terms that are multiplied by a survivability rate represent the number of VMs that are expected to survive after the relevant stages. For example, the term $(s_0+d_{s0})*(sur_0*sur_1)$ shown in Equation 2_2 represents the number of VMs that are expected to survive after the first two stages. In this case, a final value for the target number of spot VMs $ds_0$ may be determined that satisfies the inequality shown in Equation 2_2, because current stage, as those changes would not be fully loaded until a subsequent stage after the last stage, in which case the probability indicator received in the current stage may be stale and/or irrelevant. However, if the number of stages is increased, than the values corresponding to the number of spot and on-demand VMs to be added/removed at the start of each stage may be determined up to the second to last stage. In other words, the anticipated change estimator 210 may constrain the values corresponding to the potential number of VMs to be added/removed for each of the first stage up to the (N−1)-th stage from among the N sequential stages, based on the probability indicator for each of the N sequential stages.

In some embodiments, the change limiter 212 may further limit changes in the number of VMs that may be added to or removed in any given stage, and a total number of VMs that may be assigned to the workload at any given time. For example, the change limiter 212 may limit such changes using the pseudocode shown in Equation 3 below.

Equation 3:

$d_{s0} + do_0$ ≤ MaxDeltaConstraint (# of VMs added/deleted in first stage less than threshold limit)

$d_{s1} + do_1$ ≤ MaxDeltaConstraint (# of VMs added/deleted in second stage less than threshold limit)

Equation 3:

$$(s_0 + d_{s0}) + o_0 + d_{o0} \leq \text{MaxVMConstraint (total \# of VMs in first stage less than threshold limit)}$$
$$(s_0 + d_{s0}) * (sur_0) + d_{s1} + o_0 + d_{o0} + d_{o1} \leq \text{MaxVMConstraint (total \# of VMs in second stage less than threshold limit)}$$

In Equation 3, the MaxDeltaConstraint and MaxVMConstraint are threshold limits that may be predetermined, for example, to limit the maximum number of changes in the system at any given time, such that system stability may be improved. For example, each of the MaxDeltaConstraint and MaxVMConstraint may be experimentally determined according to an implementation of the provider system 102, or such change constraints may be omitted as needed or desired. In some embodiments, additional constraints restricting $d_{s0}$, $d_{o0}$, $d_{s1}$, $d_{o1}$ may be added as need or desired, for example, such as to limit the number of VMs added at each time step (e.g., at each timepoint).

The cost calculator 214 may determine a current price of a VM in the current stage, and may constrain a cost for maintaining the anticipated changed capacity in the current stage through the (N-1)th stage from among the plurality of N stages based on a budget for the workload. For example, in some embodiments, the price of a VM may fluctuate depending on the geographical region, hardware cluster (e.g., types of resource devices in the hardware cluster), utilization rates, available capacity, changes in power rates, network traffic, and/or the like. Thus, the cost of maintaining a VM in one stage may be different from that of another stage. Accordingly, in some embodiments, the cost calculator 214 may calculate the cost for maintaining the anticipated changed capacity of each of the current stage through the (N-1)th stage, and may ensure that such cost is within a budget allocated for the workload. For example, in some embodiments, the budget may correspond to a cost in a case where all of the VMs assigned to the workload are the second VM 110 (e.g., the on-demand VMs). Accordingly, in some embodiments, the cost calculator may ensure that the split between the number of on-demand VMs and the number of spot VMs is less than or equal to a target capacity number of all on-demand VMs. It should be appreciated, however, that in some embodiments, the budget may be statically set, received and set by the user, determined according to a priority of the workload, or the like.

For example, in some embodiments, the cost calculator 214 may constrain the cost for maintaining the anticipated changed capacity for each of the current stage through the (N-1)th stage using the pseudocode shown in Equation 4 below.

Equation 4:

$$4\_1) \quad (s_0 + d_{s0}) * (P_s) + (o_0 + d_{o0}) * P_o \leq P_o * t \text{ (cost of \# of spot and on-demand VMs at timepoint 0 should not exceed budget)}$$
$$4\_2) \quad ((s_0 + d_{s0}) * sur_0 + d_{s1}) * (P_s) + (o_0 + d_{o0} + d_{o1}) * P_o \leq P_o * t \text{ (cost of \# of spot and on-demand VMs at timepoint 2 should not exceed budget)}$$

In Equation 4, $P_s$ corresponds to the current price of a spot VM and $P_o$ corresponds to the current price of an on-demand VM. Thus, in the example shown in Equation 4_1, the cost at timepoint 0 may be constrained to be less than or equal to the current price of the on-demand VM $P_o$ multiplied by the target capacity t, and as shown in Equation 4_2, the cost at timepoint 2 may be constrained to be less than or equal to the current price of the on-demand VM $P_o$ multiplied by the target capacity t.

The target number predictor 216 may determine a target number of VMs (e.g., the final values of $d_{s0}$, $d_{o0}$) to configure (e.g., to add or remove) for the current stage, as well as the potential number of VMs (e.g., the final values of $d_{s1}$, $d_{o1}$) to configure for the workload in the next stage (e.g., the second stage) that minimizes a cost function, while satisfying the target capacity constraint and the budget constraint imposed by the anticipated change estimator 210 and the cost calculator 214. The target number predictor 216 may further ensure that the final values of $d_{s0}$, $d_{o0}$, $d_{s1}$, $d_{o1}$ satisfy the limits imposed by the change limiter 212. For example, in some embodiments, the target number predictor 216 may optimize (e.g., may minimize) the cost function shown in Equation 5 below.

$$(s_0+d_{s0})*(P_s)+(o_0+d_{o0})*P_o(\text{cost from 0-2 hours})+ \\ ((s_0+d_{s0})*sur_0+d_{s1})*(P_s)+(o_0+d_{o0}+d_{o1})*P_o(\text{cost from 2-4 hours})+(((s_0+d_{s0})*sur_0+d_{s1})*sur_1)* \\ (P_s)+(o_0+d_{o0}+d_{o1})*P_o(\text{cost from 4-6 hours}) \quad \text{Equation 5:}$$

In other words, in some embodiments, the target number predictor 216 may minimize the cost function shown in Equation 5, while ensuring that the values of $d_{s0}$, $d_{o0}$, $d_{s1}$, $d_{o1}$ are constrained based on the target capacity according to Equation 2, the change limit constraints according to Equation 3, and the budget constraint according to Equation 4, to determine the final values of $d_{s0}$, $d_{o0}$, $d_{s1}$, $d_{o1}$ for the target number of VMs that should be added/deleted in the current stage and the potential number of VMs that may be added/deleted in the next stage.

The target number predictor 216 may provide the number of VMs (e.g., the values of $d_{s0}$, $d_{o0}$, $d_{s1}$, $d_{o1}$) to be configured (e.g., added/deleted) for the workload in the current stage and the next stage to the change orchestrator 118, and the change orchestrator 118 may act on the target number (e.g., $d_{s0}$, $d_{o0}$) of VMs to add or remove in the current stage to configure the target number of VMs during the current stage, such that the target number of VMs may be fully loaded and ready at the start of the next stage. When the second stage starts (e.g., time 2 is reached), the second stage becomes the current stage, such that the target number may be predicted (e.g., determined) again for the second stage as the current stage based on updated data (e.g., updated probability indicator, current price, and the like). Thus, the potential number of VMs ($d_{s1}$, $d_{o1}$) that may be added/deleted in the second stage is used to constrain the final value of the target number ($d_{s0}$, $d_{o0}$) for the current stage, but the change orchestrator 118 may not act on the potential number of VMs ($d_{s1}$, $d_{o1}$)

of the second stage during the current stage, such that the target number of VMs to add or remove when the second stage becomes the current stage may be determined again. Accordingly, a target number of VMs may be automatically adjusted and configured during a current stage to be fully loaded for a subsequent stage according to variable evictions rates over an extended time horizon to maintain or substantially maintain a target capacity over the extended time horizon in consideration of a configuration time of the VMs, while minimizing or reducing costs.

Figure 3:
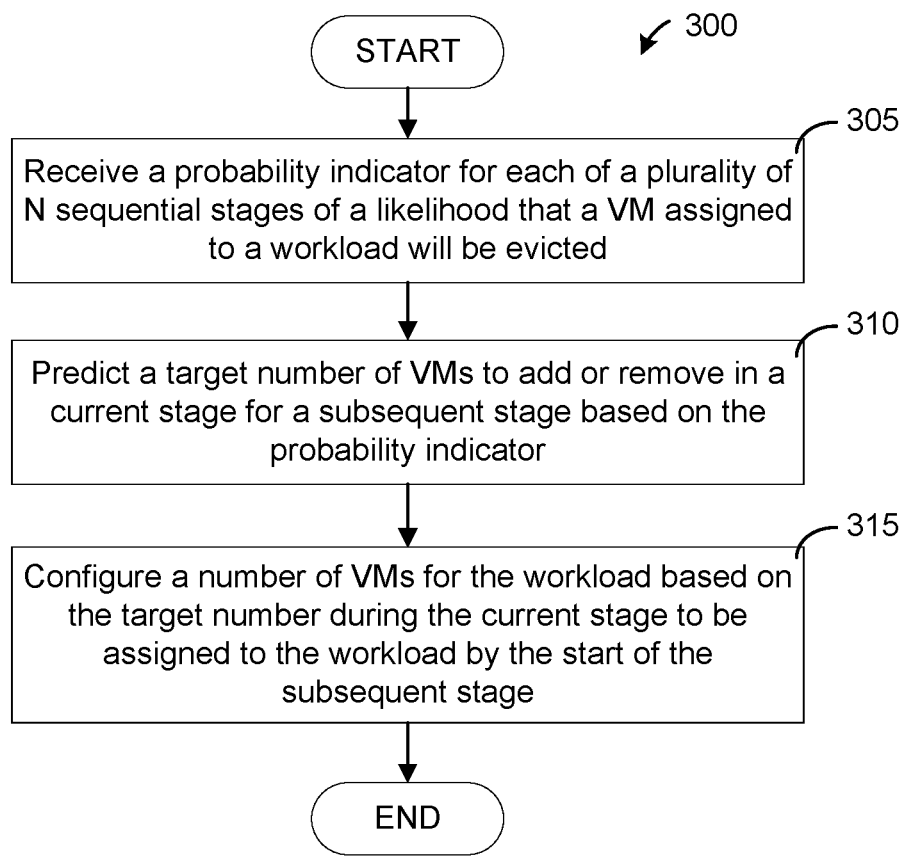
FIG. 3 is a flow diagram illustrating a method for dynamically adjusting a number of virtual machines for a workload according to one or more embodiments of the present disclosure.

FIG. 3 is a flow diagram illustrating a method for dynamically adjusting a number of virtual machines for a workload according to one or more embodiments of the present disclosure.

While some example representative operations of the method 300 are described in more detail below, the present disclosure is not limited to the sequence or number of the operations of the method 300 shown in FIG. 3, and can be altered into any desired sequence or number of operations as recognized by a person having ordinary skill in the art. For example, the order may vary, or the method 300 may include fewer or additional operations. Further, the operations shown in the method 300 may be performed by any suitable one of the components or any suitable combination of the components of those of one or more example embodiments described above, and thus, are not limited to the examples described below.

Referring to FIG. 3, the method 300 starts, and a probability indicator for each of a plurality of N sequential stages of a likelihood that a VM assigned to a workload will be evicted is received at block 305. For example, in some embodiments, the target mix recommender 116 may receive the probability indicator from the eviction rate predictor 114. The probability indicator may correspond to the eviction rates or the survivability rates described above. For example, in some embodiments, the eviction rate predictor 114 may provide the eviction rates for each of the plurality of N sequential stages as the probability indicator. In this case, as discussed above, the anticipated change estimator 210 may generate the survivability rates for each of the plurality of N sequential stages based on the eviction rates (e.g., survivability rate=1−eviction rate). In some embodiments, the eviction rate predictor 114 may first generate the survivability rates for each of the plurality of N sequential stages based on the eviction rates, and may provide the survivability rates for each of the plurality of N sequential stages as the probability indicator.

A target number of VMs to add or remove (e.g., to configure) in a current stage for a subsequent stage is predicted based on the probability indicator at block 310. For example, in some embodiments, the target mix recommender 116 (e.g., the target number predictor 216) may predict the target number based on the current number of VMs (e.g., current number of spot and on-demand VMs), the probability indicator, the target capacity for the workload, and a current price for maintaining a VM. In some embodiment, the target mix recommender 116 (e.g., the change limiter 212) may further constrain the target number by limiting changes in the number of VMs that may be added to or removed from any given stage, and may further constrain the target number by limiting a total number of VMs that may be assigned to the workload at any given time. For example, in some embodiments, the operations of block 310 may further include the operations of the method 400 shown in FIG. 4, which will be described in more detail below.

A number of VMs for the workload are configured based on the target number during the current stage to be loaded (e.g., fully loaded and functional) for the workload by the start of the subsequent stage at block 315, and the method 300 may end. For example, in some embodiments, the target mix recommender 116 (e.g., the target number predictor 216) may transmit the target number to the change orchestrator 118 to configure the target number of VMs during the current stage. In some embodiments, the target mix recommender 116 may include the change orchestrator 118, such that the target mix recommender 116 may configure the target number of VMs during the current stage.

Accordingly, at the start the subsequent stage (e.g., the (N−1)-th stage), the target number of VMs determined in the previous stage (e.g., the first stage) may already be fully loaded, such that the target number of VMs determined in the first stage may be included in the current number of VMs (e.g., $s_0+O_0$) of the subsequent stage. Thus, the subsequent stage (e.g., the (N−1)-th stage) becomes the current stage, the first stage becomes the previous stage, and the method 300 may repeat for the subsequent stage as the current stage based on updated values (e.g., for the probability indicator, the current price, and/or the like).

Figure 4:
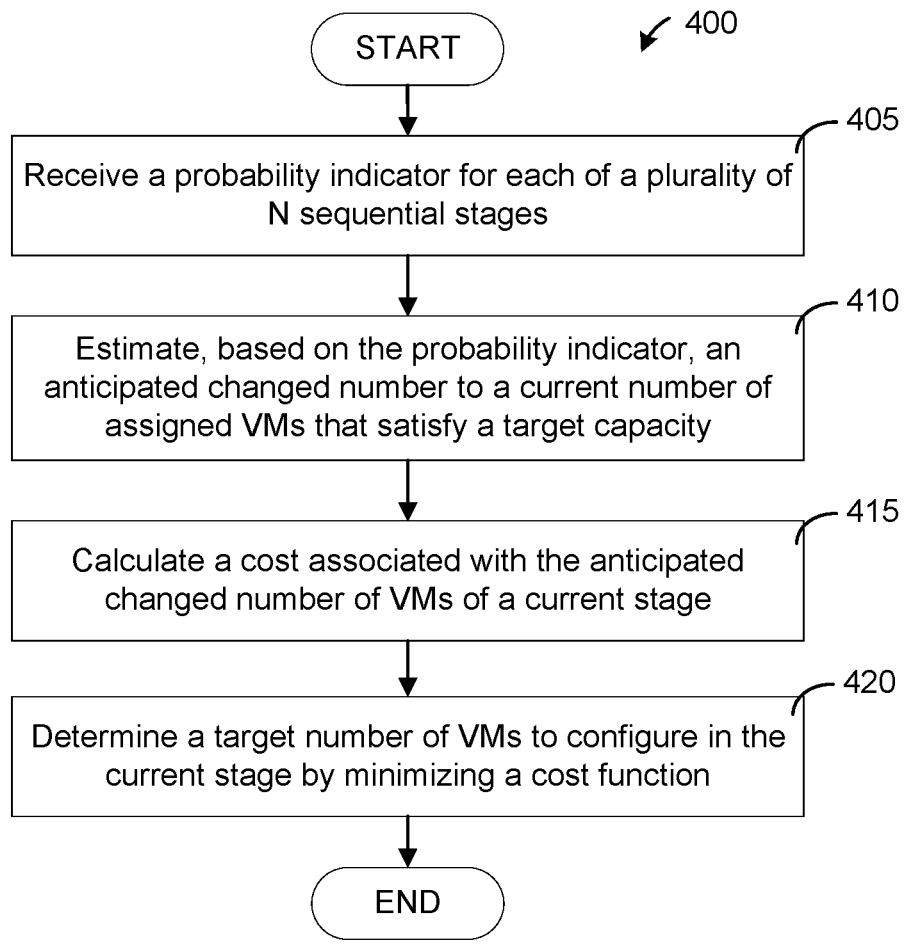
FIG. 4 is a flow diagram illustrating a method for predicting a target number of virtual machines for a workload according to one or more embodiments of the present disclosure.

FIG. 4 is a flow diagram illustrating a method for predicting a target number of virtual machines for a workload according to one or more embodiments of the present disclosure.

While some example representative operations of the method 400 are described in more detail below, the present disclosure is not limited to the sequence or number of the operations of the method 400 shown in FIG. 4, and can be altered into any desired sequence or number of operations as recognized by a person having ordinary skill in the art. For example, the order may vary, or the method 400 may include fewer or additional operations. Further, the operations shown in the method 400 may be performed by any suitable one of the components or any suitable combination of the components of those of one or more example embodiments described above, and thus, are not limited to the examples described below. Moreover, the operations described hereinafter with reference to the method 400 may be performed concurrently or at least some of the operations may be performed sequentially.

Referring to FIG. 4, a probability indicator for each of the plurality of N sequential stages is received at block 305 of the method 300 described above, and the method 400 (e.g., corresponding to the block 310 of the method 300 described above) starts.

An anticipated changed capacity of the workload is estimated for each of the N sequential stages based on a current number of VMs and the probability indicator at block 405, and a value of a target number of VMs to configured during a current stage is constrained according to the anticipated changed capacity of each of the N sequential stages and a target capacity at block 410. For example, in some embodiments, the target mix recommender 116 (e.g., the anticipated change estimator 210) estimates an anticipated changed capacity corresponding to a current number of VMs assigned to the workload at the start of the first stage that is changed during each of the plurality of N stages based on the probability indicator for each of the plurality of N stages and a potential number of VMs that may be added or removed during the plurality of N stages in order to satisfy the target capacity. For example, in some embodiments, the target mix recommender 116 (e.g., the anticipated change estimator 210) may estimate the anticipated changed capacity for the current stage based on Equation 1 described above, and may estimate the anticipated changed capacity for each of the subsequent stages based on the anticipated changed capacity of the current stage and the probability indicator of each of the N sequential stages as shown in Equation 2 described above. The anticipated changed capacity for each of the plurality of N stages, which includes the target number of VMs to add or remove during the current stage ($d_{s0}$, $d_{o0}$) and the potential number of VMs to add or remove during the second stage ($d_{s1}$, $d_{o1}$), may be constrained together based on the target capacity (t) according to Equation 2 described above.

In more detail, to estimate the anticipated changed capacity for each of the plurality of N stages, the anticipated change estimator 210 may determine a current number (e.g., $s_0+O_0$) of VMs assigned to the workload at a start (e.g., at timepoint 0) of the current stage. In some embodiments, because any changes to the current number of VMs may take one stage to load, the anticipated change estimator 210 may estimate the anticipated changed capacity for the current stage corresponding to a change in the number of VMs at the end (e.g., at timepoint 2) of the current stage according to the current number (e.g., $s_0+O_0$) and the first probability indicator (e.g., $sur_0$). The changed capacity for the current stage also considers the potential number of VMs (e.g., $ds_0$, $d_{O0}$) that may be added or removed during the current stage in order to satisfy the target capacity (t). The potential number of VMs (e.g., $ds_0$, $d_{O0}$) that may be added or removed during the current stage may correspond to the target number of VMs (e.g., $d_{s0}$, $d_{O0}$) to add or remove during the current stage, which is constrained by the target capacity (t) as shown in Equation 2_1.

In some embodiments, the anticipated change estimator 210 may further constrain the target number of VMs (e.g., $ds_0$, $d_{O0}$) to add or remove during the current stage based on the second probability indicator (e.g., sure) to ensure that the anticipated changed capacity of the current stage is sufficient to maintain or substantially maintain the target capacity for the second stage, even when one or more VMs are evicted during the second stage. For example, in some embodiments, the anticipated change estimator 210 may further constrain the target number of VMs (e.g., $ds_0$, $d_{O0}$) to add or remove during the current stage to satisfy the target capacity (t) based on the anticipated changed capacity of the current stage and any potential changes thereto resulting from the second probability indicator (e.g., $sur_1$). For example, in some embodiments, the anticipated change estimator 210 may further constrain the values of the target number of VMs (e.g., $ds_0$, $d_{O0}$) to add or remove during the current stage based on the second probability indicator (e.g., sure) according to Equation 2_2 described above, such that the anticipated changed capacity of the current stage may be constrained to maintain or substantially maintain the target capacity (t) during the first two stages (e.g., from 0-2 hours and from 2-4 hours). It should be noted that the values of the target number of VMs (e.g., $ds_0$, $d_{O0}$) in Equation 2_2 may be independently constrained from the values of the potential number of VMs (e.g., $ds_1$, $d_{O1}$) included in the anticipated changed capacity of the second stage as described in more detail below.

In some embodiments, the anticipated change estimator 210 may estimate an anticipated changed capacity for the second stage based on the anticipated changed capacity of the first stage and the second probability indicator (e.g., $sur_1$). Here, the anticipated changed capacity for the second stage may further consider changes to the number of VMs that may be attributed to a potential number of VMs (e.g., $ds_1$, $d_{O1}$) that may be added or removed during the second stage in order to satisfy the target capacity (t). For example, the anticipated changed capacity for the second stage may consider changes to the current number of VMs resulting from the first and second probability indicators (e.g., $sur_1$, $sur_2$), as well as changes resulting from the target number of VMs (e.g., $ds_0$, $d_{O0}$) to add or remove during the current stage, and any potential number of VMs (e.g., $ds_1$, $d_{O1}$) that may be added or removed during the second stage in order to satisfy the target capacity (t). For example, the anticipated change estimator 210 may estimate the anticipated changed capacity for the second stage according to Equation 2_3 described above, such that the anticipated changed capacity of the second stage, including any potential changes resulting from the potential number of VMs (e.g., $ds_1$, $d_{O1}$) that may be added or removed during the second stage, may maintain or substantially maintain the target capacity (t) for the second stage (e.g., from 2-4 hours after the potential number of VMs changes are applied).

In some embodiments, because any changes to the number of VMs in the last stage may not be loaded (e.g., full loaded) until a subsequent stage after the last stage, the anticipated change estimator 210 may estimate an anticipated changed capacity for the last stage based on the anticipated changed capacity of the current stage, the anticipated changed capacity of the second stage, and the third probability indicator (e.g., $sur_2$). Here, the anticipated changed capacity for the last stage may further constrain the values of the target number of VMs (e.g., $ds_0$, $d_{O0}$) to add or remove during the current stage and the potential number of VMs (e.g., $ds_1$, $d_{O1}$) to add or remove during the second stage based on anticipated changes to the number of VMs in the last stage that may be attributed to the third probability indicator (e.g., $sur_2$) in order to satisfy the target capacity (t). For example, in some embodiments, the anticipated change estimator 210 may estimate the anticipated changed capacity of the last stage according to equation 2_4 described above, such that number of VMs (e.g., $ds_0$, $d_{O0}$, $ds_1$, $d_{O1}$) that are added or removed in the first and second stages are sufficient to maintain or substantially maintain the target capacity (t) for the last stage (e.g., from 4-6 hours), even if a number of VMs are evicted during the last stage.

Accordingly, in some embodiments, the anticipated change estimator 210 may constrain the values (e.g., $d_{s0}$, $d_{o0}$, $d_{s1}$, $d_{o1}$) of VMs to add in the first and second stages by constraining the anticipated changed capacity of each of the plurality of N sequential stages to satisfy the target capacity (t). Accordingly, the target capacity may be maintained or substantially maintained for each of the plurality of N sequential stages, even when one or more VMs are removed during one or more of the plurality of N sequential stages.

In some embodiments, as discussed above with reference to FIG. 2, the target mix recommender 116 (e.g., the change limiter 212) may further constrain the values (e.g., $d_{s0}$, $d_{o0}$, $d_{s1}$, $d_{o1}$) of the anticipated changes in the first and second stages, such that a total number of VMs that may be added to or removed in any given stage, and/or a total number of VMs that may be assigned to the workload at any given time may be further limited. For example, in some embodiments, the values of the target number (e.g., $d_{s0}$, $d_{o0}$) of VMs to add or remove during the current stage and the values of the potential number (e.g., $d_{s1}$, $d_{o1}$) of VMs to add or remove during the second stage may be further constrained according to the thresholds MaxDeltaConstraint and MaxVMConstraint shown in Equation 3 above. Accordingly, system stability may be improved.

A current cost associated with the anticipated changed capacity of the current stage is calculated at block 415, and the values of the target number of VMs may be constrained according to the current cost and a budget allocated for the workload at block 420. For example, in some embodiments, the target mix recommender 116 (e.g., the cost calculator 214) may calculate the current cost associated with the anticipated changed capacity of the current stage and the anticipated changed capacity of the second stage to further constrain the values (e.g., $d_{s0}$, $d_{o0}$, $d_{s1}$, $d_{o1}$) of the anticipated changes in the first and second stages according to a budget allocated for the workload. The current cost may be calculated based on a current price of a VM in a particular region where the VM is located, and the budget may correspond to the target number of on-demand VMs. For example, in some embodiments, the target mix recommender 116 (e.g., the cost calculator 214) may calculate the cost based on Equation 4 described above.

In more detail, the target mix recommender 116 (e.g., the cost calculator 214) may determine the current price for maintaining a VM for the workload, and may calculate a current cost associated with each of the anticipated changed capacity of the first stage and the anticipated changed capacity of the second stage based on the current price. For example, as shown in Equation 4_1 above, the cost calculator 214 may calculate a current cost associated with the anticipated changed capacity of the current stage by multiplying the current price with the anticipated changed capacity of the current stage, and as shown in Equation 4_2 above, the cost calculator 214 may calculate a current cost associated with the anticipated changed capacity of the second stage by multiplying the current price with the anticipated changed capacity of the second stage.

The cost calculator 214 may constrain the values (e.g., $d_{s0}$, $d_{o0}$, $d_{s1}$, $d_{o1}$) of the anticipated changes in the first and second stages based on the budget, such that the costs of the anticipated changed capacity of each of the first and second stages are less than or equal to the budget. As discussed above, the budget may be determined by the current price of all of the VMs being an on-demand type of VM, may be statically set, may be received and set by the user, may be determined according to a priority of the workload, or the like. Accordingly, in some embodiments, the cost calculator 214 may constrain the values (e.g., $d_{s0}$, $d_{o0}$, $d_{s1}$, $d_{o1}$) of the target number of VMs to add or remove in the first stage and the potential number of VMs to add or remove in the second stages according to the budget, such that the cost of VMs in the first and second stages are less than or equal to the budget.

A cost function corresponding to the current cost of maintaining a suitable number of VMs throughout the plurality of N sequential stages may be generated at block 425. For example, as discussed above, the cost function of a stage may correspond to (a number of spot VMs×current price of spot VMs)+(a number of on-demand VMs×current price of on-demand VMs). Thus, in some embodiments, the cost function for the plurality of N sequential stages may be generated (e.g., by the target number predictor 216) as (the anticipated changed capacity of the current stage×the current price)+(the anticipated changed capacity of the second stage×the current price)+(the anticipated changed capacity of the last stage×by the current price), for example, as shown in Equation 5 above.

A final value for the target number of VMs to configure in the current stage is calculated that minimizes the cost function while satisfying at least the target capacity constraint and the budget constraint at block 430. For example, in some embodiments, the target mix recommender 116 (e.g., the target number predictor 216) predicts (e.g., determines) the final values of the target number (e.g., $d_{s0}$, $d_{o0}$) of VMs to add/remove in the current stage and the final values of the potential number (e.g., $d_{s1}$, $d_{o1}$) of VMs to add/remove in the second stage by minimizing the cost function (e.g., shown in Equation 5 discussed above), while the values (e.g., $d_{s0}$, $d_{o0}$, $d_{s1}$, $d_{o1}$) are constrained according to at least the target capacity constraint and the budget constraint discussed above. In some embodiments, the cost function may be minimized while the change constraints described above further limit the final values (e.g., $d_{s0}$, $d_{o0}$, $d_{s1}$, $d_{o1}$). In other words, in some embodiments, the target number predictor 216 may calculate the final values (e.g., $d_{s0}$, $d_{o0}$, $d_{s1}$, $d_{o1}$ that satisfy the constraints imposed by the anticipated change estimator 210, the change limiter 212, and the cost calculator, and that minimizes or reduces the cost function.

Accordingly, the method 400 may end, such that the target mix recommender 116 may configure a number of VMs for the workload based on the target number (e.g., $ds_0$, $d_{O0}$) of VMs to add or remove in the current stage at block 315 of the method 300. For example, the target mix recommender 116 may provide the target number (e.g., $d_{s0}$, $d_{o0}$) to the change orchestrator 118, such that the change orchestrator 118 may begin to configure the number of VMs in the current stage, or the target mix recommender 116 may directly configure the number of VMs in the current stage, for example, when the change orchestrator 118 is implemented as part of the target mix recommender 116.

Accordingly, by the start the subsequent stage (e.g., the (N−1)-th stage), the target number of VMs determined for the previous stage (e.g., the first stage) may already be fully loaded and ready to service the workload for the subsequent stage. In some embodiment, the methods 300 and 400 may be repeated for the subsequent stage as the current stage based on updated values (e.g., for the probability indicator, the current price, and/or the like).

When a certain embodiment may be implemented differently, a specific process order may be different from the described order. For example, two consecutively described processes may be performed at the same or substantially at the same time, or may be performed in an order opposite to the described order.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or component is referred to as being "connected to," "in communications with," or "coupled to" another element or component, it can be directly connected to, in communications with, or coupled to the other element or component, or one or more intervening elements or components may be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof.

As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the example embodiments of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. A method for dynamically adjusting a number of virtual machines for a workload, comprising:
   receiving a set of probability indicators for a plurality of N sequential stages of a likelihood that a virtual machine assigned to a workload will be evicted during the N sequential stages, wherein the plurality of N sequential stages comprises a current stage, an (N−1)-th stage after the current stage as the subsequent stage, and an N-th stage after the (N−1)-th stage as a last stage from among the plurality of N sequential stages, and wherein the set of probability indicators comprises:
      a first probability indicator of a likelihood that a virtual machine assigned to the workload will be evicted during the current stage;
      an (N−1)-th probability indicator of a likelihood that a virtual machine assigned to the workload will be evicted during the subsequent stage; and
      an N-th probability indicator of a likelihood that a virtual machine assigned to the workload will be evicted during the last stage;
   predicting a target number of virtual machines to configure in the current stage for the subsequent stage from among the plurality of N sequential stages based on the set of probability indicators, a target capacity for the workload, and a current price for maintaining a virtual machine; and
   configuring a number of virtual machines for the workload during the current stage based on the target number to be loaded for the workload for the subsequent stage.

2. The method of claim 1, wherein the N sequential stages correspond to different time horizons from each other.

3. The method of claim 2, wherein a length of each of the N sequential stages corresponds to a configuration time of a virtual machine, and the configuring of the number of virtual machines for the workload takes a length of one stage to complete.

4. The method of claim 1, wherein the predicting of the target number comprises:
   constraining, based on a target capacity for the workload, the target number based on an anticipated changed capacity estimated for each of the plurality of N sequential stages;
   constraining, based on a budget allocated for the workload, the target number based on a cost associated with the anticipated changed capacity of each of the current stage and the subsequent stage; and calculating, based on a cost function, a final value for the target number that minimizes the cost function, while satisfying at least the constraints based on the target capacity and the budget.

5. The method of claim 4, wherein the final value for the target number is determined according to an integer linear program, and the constraints based on the target capacity and the budget are inputs constraining the target number in the cost function.

6. The method of claim 4, wherein to estimate the anticipated changed capacity for each of the plurality of N sequential stages, the method comprises:
   determining a current number of virtual machines assigned to the workload at a start of the current stage;
   estimating the anticipated changed capacity for the current stage that satisfy the target capacity, the anticipated changed capacity for the current stage corresponding to a change in the current number of virtual machines at an end of the current stage based on the first probability indicator and a value of the target number that is constrained by the target capacity;
   estimating an anticipated changed capacity for the subsequent stage that satisfy the target capacity based on the anticipated changed capacity for the current stage, the (N−1)-th probability indicator, and a value of a potential number of virtual machines to configure during the subsequent stage that is constrained by the target capacity; and
   estimating an anticipated changed capacity for the last stage that satisfy the target capacity based on the anticipated changed capacity of the current stage, the anticipated changed capacity of the subsequent stage, and the N-th probability indicator,
   wherein the anticipated changed capacity for the last stage further constrains the values of the target number and the potential number based on the target capacity.

7. The method of claim 6, wherein to determine the cost associated with the anticipated changed capacity of each of the current stage and the subsequent stage, the method comprises:
   determining a current price for maintaining a virtual machine for the workload;
   calculating a current cost associated with the anticipated changed capacity of the current stage based on the current price, and constrained by the budget; and
   calculating a current cost associated with the anticipated changed capacity of the subsequent stage based on the current price, and constrained by the budget.

8. The method of claim 7, wherein the target number of virtual machines comprises a first virtual machine, and a second virtual machine having a higher cost than that of the first virtual machine, and
   wherein the budget corresponds to the target capacity multiplied by the higher cost of the second virtual machine.

9. The method of claim 4, wherein the final value for the target number is further constrained according to a threshold limit of a maximum number of virtual machines that may be added in one stage, and a threshold limit of a total number of virtual machines that may be assigned to the workload at any given time.

10. A system for dynamically adjusting a number of virtual machines assigned to a workload, comprising:
    a processor; and
    memory comprising instructions that, when executed by the processor, cause the processor to:
       receive a set of probability indicators for a plurality of N sequential stages of a likelihood that a virtual machine assigned to a workload will be evicted during the N sequential stages, wherein the plurality of N sequential stages comprises a current stage, an (N−1)-th stage after the current stage as the subsequent stage, and an N-th stage after the (N−1)-th stage as a last stage from among the plurality of N sequential stages, and wherein the set of probability indicators comprises:
          a first probability indicator of a likelihood that a virtual machine assigned to the workload will be evicted during the current stage;
          an (N−1)-th probability indicator of a likelihood that a virtual machine assigned to the workload will be evicted during the subsequent stage; and
          an N-th probability indicator of a likelihood that a virtual machine assigned to the workload will be evicted during the last stage;
       predict a target number of virtual machines to configure in the current stage for the subsequent stage from among the plurality of N sequential stages based on set of the probability indicators, a target capacity for the workload, and a current price for maintaining a virtual machine; and
       configure a number of virtual machines for the workload during the current stage based on the target number to be loaded for the workload for the subsequent stage.

11. The system of claim 10, wherein the N sequential stages correspond to different time horizons from each other.

12. The system of claim 11, wherein a length of each of the N sequential stages corresponds to a configuration time of a virtual machine, and the configuring of the number of virtual machines for the workload takes a length of one stage to complete.

13. The system of claim 10, wherein to predict the target number, the instructions further cause the processor to:
    constrain, based on a target capacity for the workload, the target number based on an anticipated changed capacity estimated for each of the plurality of N sequential stages;
    constrain, based on a budget allocated for the workload, the target number based on a cost associated with the anticipated changed capacity of each of the current stage and the subsequent stage; and
    calculate, based on a cost function, a final value for the target number that minimizes the cost function, while satisfying at least the constraints based on the target capacity and the budget.

14. The system of claim 13, wherein the final value for the target number is determined according to an integer linear program, and the constraints based on the target capacity and the budget are inputs constraining the target number in the cost function.

15. The system of claim 13, wherein to estimate the anticipated changed capacity for each of the plurality of N sequential stages, the instructions further cause the processor to:
    determine a current number of virtual machines assigned to the workload at a start of the current stage;
    estimate the anticipated changed capacity for the current stage that satisfy the target capacity, the anticipated changed capacity for the current stage corresponding to a change in the current number of virtual machines at an end of the current stage based on the first probability indicator and a value of the target number that is constrained by the target capacity;

estimate an anticipated changed capacity for the subsequent stage that satisfy the target capacity based on the anticipated changed capacity for the current stage, the (N−1)-th probability indicator, and a value of a potential number of virtual machines to configure during the subsequent stage that is constrained by the target capacity; and estimate an anticipated changed capacity for the last stage that satisfy the target capacity based on the anticipated changed capacity of the current stage, the anticipated changed capacity of the subsequent stage, and the N-th probability indicator, wherein the anticipated changed capacity for the last stage further constrains the values of the target number and the potential number based on the target capacity.

16. The system of claim 15, wherein to determine the cost associated with the anticipated changed capacity of each of the current stage and the subsequent stage, the instructions further cause the processor to:

determine a current price for maintaining a virtual machine for the workload;

calculate a current cost associated with the anticipated changed capacity of the current stage based on the current price, and constrained by the budget; and calculate a current cost associated with the anticipated changed capacity of the subsequent stage based on the current price, and constrained by the budget.

17. The system of claim 16, wherein the target number of virtual machines comprises a first virtual machine, and a second virtual machine having a higher cost than that of the first virtual machine, and wherein the budget corresponds to the target capacity multiplied by the higher cost of the second virtual machine.

18. The system of claim 13, wherein the final value for the target number is further constrained according to a threshold limit of a maximum number of virtual machines that may be added in one stage, and a threshold limit of a total number of virtual machines that may be assigned to the workload at any given time.

19. A device comprising:

a processor; and memory comprising instructions that, when executed by the processor, perform operations comprising:

receive a set of probability indicators for a plurality of N sequential stages of a likelihood that a virtual machine assigned to a workload will be evicted during the N sequential stages, wherein the plurality of N sequential stages comprises a current stage, an (N−1)-th stage after the current stage as the subsequent stage, and an N-th stage after the (N−1)-th stage as a last stage from among the plurality of N sequential stages, and wherein the set of probability indicators comprises:

a first probability indicator of a likelihood that a virtual machine assigned to the workload will be evicted during the current stage;

an (N−1)-th probability indicator of a likelihood that a virtual machine assigned to the workload will be evicted during the subsequent stage; and an N-th probability indicator of a likelihood that a virtual machine assigned to the workload will be evicted during the last stage;

predict a target number of virtual machines to configure in the current stage for the subsequent stage from among the plurality of N sequential stages based on set of the probability indicators, a target capacity for the workload, and a current price for maintaining a virtual machine; and configure a number of virtual machines for the workload during the current stage based on the target number to be loaded for the workload for the subsequent stage.

20. The device of claim 19, wherein a length of each of the N sequential stages corresponds to a configuration time of a virtual machine, and the configuring of the number of virtual machines for the workload takes a length of one stage to complete.

* * * * *